Figure 1:
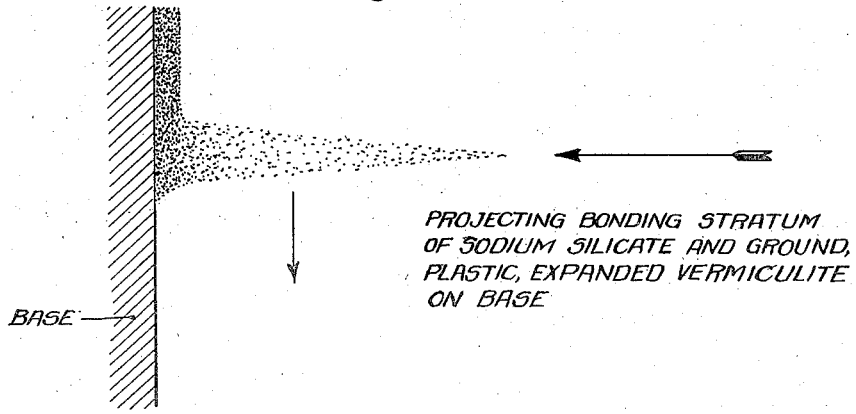

April 13, 1937.   O. A. LABUS ET AL   2,076,898
HEAT INSULATING STRUCTURE AND METHOD OF PRODUCTION
Filed March 28, 1935

BASE

PROJECTING BONDING STRATUM OF SODIUM SILICATE AND GROUND, PLASTIC, EXPANDED VERMICULITE ON BASE

BASE

INSULATING CEMENT OF GROUND, RAW VERMICULATE AND PLASTIC, EXPANDED VERMICULATE

BONDING STRATUM

Inventors
Otto A. Labus,
William J. Motr.
By Walter M. Fuller atty.

Patented Apr. 13, 1937

2,076,898

UNITED STATES PATENT OFFICE 2,076,898

HEAT INSULATING STRUCTURE AND METHOD OF PRODUCTION

Otto A. Labus, Wisconsin Rapids, Wis., and William J. Mohr, Chicago, Ill., assignors to Universal Insulation Company, Chicago, Ill., a corporation of Illinois Application March 28, 1935, Serial No. 13,480

6 Claims. (Cl. 72—17)

The value of applying insulation to the surfaces of furnaces, ovens, calciners, etc., is becoming increasingly important because of the ensuing material savings in fuel, but it has been found that great difficulty is experienced in causing the insulation to adhere to surfaces such as those of fire-brick, sufficiently so that under operating conditions, the insulation does not become loosened from the surfaces and drop off due to the heat, this being particularly true on certain surfaces of an open-hearth furnace. One of the leading purposes of our present invention is to provide means and a method by which this failure of bond at higher temperatures can be overcome or rendered insignificant.

The usual or ordinary methods of attaching insulating cement to a surface for heat isolation or preservation purposes are (a) to apply the cement to the surface with dependence upon the natural or inherent adhesive properties of the colloidal, usually argillaceous, bonding material to supply the union to the surface; or (b) to use metal-fabric to support the cement with little reliance upon surface adhesion.

The first-mentioned procedure has the disadvantage of failure of the structure when the temperature of the colloidal bonding material has increased to the point where the gelatinous or colloidal property of the material is destroyed by the heat, the material then being held in place only by such mechanical bonding aids as may have been employed.

The second method, while more positive and certain in securing the material in place, is comparatively expensive, and when the temperature becomes too high, the usual type of metal fails.

A method of applying an insulating cement, such as a mixture of finely-ground, raw vermiculite and a plastic, expanded vermiculite in the proportion of forty pounds to sixty pounds, with water enough to make the mixture plastic, has been discovered by us and it is relatively inexpensive and yet completely effective at most ordinary temperatures and it is a distinct improvement over the aforesaid procedures.

In performing the new process in accordance with the principles of the present invention a stratum of adhesive material is first applied to the surface to be insulated and then one or more layers of insulating cement are applied over such initial coating of adhesive, the latter being of such material that adequate bond is maintained at usual temperatures, sodium silicate having been found satisfactory for this purpose.

The following describes in detail a method which will be found convenient and advantageous in practicing this invention and which is illustrated in the accompanying drawing in which:—

Figure 1 presents the projection of the bonding stratum on the base; and

Figure 2:
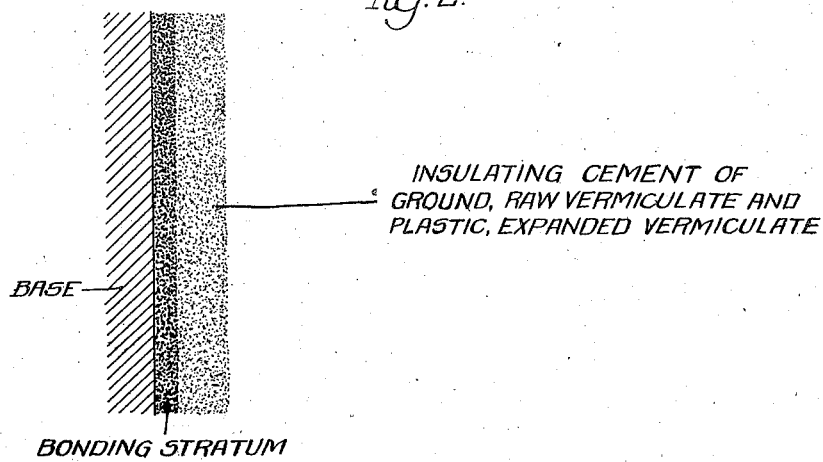

Figure 2 shows the application of the insulating cement stratum on the bonding stratum.

65 pounds of dry, ground, plastic, expanded vermiculite is stirred into 50 pounds of sodium silicate of approximately 50° Bé., specific gravity 14.5% $Na_2O$, 29.0% $SiO_2$, and 56.5% water, thereby providing a fairly thick paste which is promptly applied to the wall in a stratum about $\frac{1}{16}$ to $\frac{1}{4}$ inch thick by means of a trowel.

If such paste is too thick, it can be thinned by the addition of a small quantity of water; and, on the other hand, if the mixture is too thin, it can be thickened by the addition of more of the vermiculite.

The insulation cement, referred to above, should be applied fairly quickly to such first coat before a thick skin forms by reason of the drying out of the silicate of soda.

Better results are ordinarily obtained when the insulation cement is applied in several layers and the initial layer should be fairly thin, about $\frac{1}{4}$ inch, and trowelled on rather firmly in order to be partially mixed in with the silicate layer.

This application can then be followed with the remaining portion of the cement in as many layers as may be found to be expedient or practicable.

The mass should not be dried too rapidly by the use of heat, as otherwise steam may form underneath and result in a bond failure in such area, the best results accruing when the cement is applied over a surface that does not have too much expansion due to increase in temperature.

If the surface is composed of material which has comparatively high expansion and contraction due to temperature changes, such as silica-brick, frequently used in the construction of open-hearth furnaces, it is advisable to apply the cement to the hot bricks in the following manner:

A mixture of equal parts by volume of the first layer bonding material and of the insulating cement is formed and shaped into balls or portions with the hands or otherwise, and these balls or individual charges are thrown or projected directly onto the hot surface at various points or spots until a sufficient area of the surface, partial or whole, has been covered to provide a satisfactory bond between the bricks and the insulation cement, whereupon the latter can be applied in several layers to the hot surface which has been thus more or less covered with the bonding mixture and after the latter has been dried out sufficiently to be strong enough to hold the cement.

It is necessary only that these covered areas of the hot wall dry out enough to give strength so that steam will not form underneath when the final coat is applied, as the development of such steam beneath the coating would have a distinct tendency to destroy the bond.

The small spots of insulation conduct the steam away rapidly enough through their surfaces to prevent a bond failure.

The foregoing sets forth in detail how this novel invention may be used successfully, but it is not intended to limit the scope of the invention to the above description because numerous modifications of procedure may be resorted to and different materials substituted without departing from the spirit or essence of the invention; for instance, it is possible to employ other materials, such as clays, in place of the dry, ground, expanded vermiculite referred to.

We claim:

1. The method of heat-insulating a base, consisting in projecting a bonding material incorporating heat-insulating cement onto the base while the latter is hot to secure bond between the material and the hot base, and then applying heat-insulating cement to the coated base after the bonding mixture has dried out sufficiently to be strong enough to hold the insulating-cement.

2. The method of heat-insulating a base consisting in projecting independent charges of a bonding material incorporating heat-insulating cement onto the base while the latter is hot to secure bond between such charges and the hot base, and then applying heat-insulating cement to the charge-coated base after the bonding mixture has dried out sufficiently to be strong enough to hold the insulating cement.

3. The method presented in claim 2 in which the bonding material consists of about one-half of a mixture of sodium silicate and dry ground expanded vermiculite and about one-half of a mixture of finely-ground vermiculite and plastic expanded vermiculite and in which the heat-insulating cement is composed of a mixture of finely-ground vermiculite and plastic expanded vermiculite.

4. In a heat-insulating structure, the combination of a base, a bonding stratum adhering to said base and capable of maintaining its adhesion thereto under most temperatures and containing sodium silicate and ground expanded vermiculite, and a layer of heat-insulating cement covering said bonding stratum and held to the base thereby and containing finely ground vermiculite and expanded vermiculite.

5. In a heat-insulating structure, the combination of a base, a bonding stratum adhering to said base and capable of maintaining its adhesion thereto under most temperatures and containing sodium silicate and ground plastic expanded vermiculite, and a layer of heat-insulating cement covering said bonding stratum and held to the base thereby and containing finely ground raw vermiculite and plastic expanded vermiculite.

6. In a heat-insulating structure, the combination of a base, a bonding stratum adhering to said base and capable of maintaining its adhesion thereto under most temperatures and consisting of about one-half of a mixture of sodium silicate and dry ground expanded vermiculite and about one-half of a mixture of finely ground vermiculite and plastic expanded vermiculite, and a layer of heat-insulating cement covering said bonding stratum and held to the base thereby and composed of a mixture of finely ground vermiculite and plastic expanded vermiculite.

OTTO A. LABUS.
WILLIAM J. MOHR.